United States Patent Office 2,775,148
Patented Dec. 25, 1956

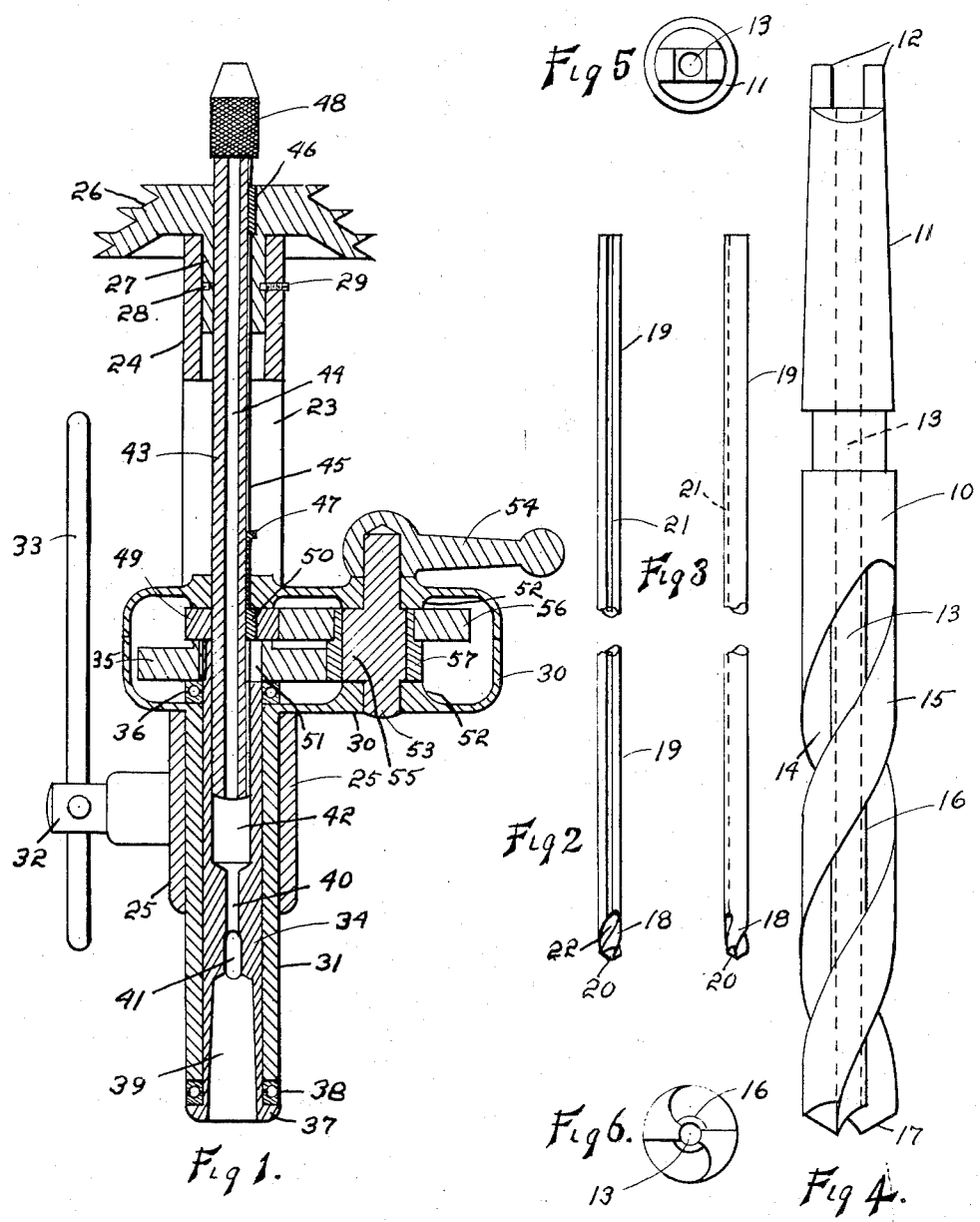

2,775,148
CONCENTRIC DRILL AND DRILL PRESS FOR USE THEREWITH

James Hunter Campbell, Richmond, N. H.

Application April 8, 1952, Serial No. 281,110

1 Claim. (Cl. 77—55)

This invention relates to compound concentric twist drills and to a drill press for operating drills.

It is well recognized that the revolutions per minute at which a drill may be run depends, to a large extent, upon its peripheral speed. Assuming that the peripheral speed of a drill should not exceed sixty feet per minute, the most practical speed for running a one-quarter inch drill is 900 revolutions per minute while a corresponding one inch drill would have 225 revolutions per minute as its most practical speed. With a one inch drill, the drilling of the one-quarter inch central core of the one inch hole takes correspondingly longer than the drilling of a quarter inch hole with a quarter inch drill. This is due to two factors of which one is the substantially higher rate of rotation practicable with the quarter inch drill and the other is the size of the web at the cutting point which separates the lands.

The major objective of this invention is to enable holes to be more rapidly drilled relative to their diameter and, in accordance with the invention, there is provided a compound drill comprising a first drill member having an axial bore extending from end to end thereof, and a second drill member in the bore and rotatable relative to the first drill member. The second drill member is of such length that its point and the end of its shank are exposed beyond the corresponding ends of the first drill member.

The invention also relates to a drill press for use with such concentric drills and in a drill press, in accordance with the invention, there is a first spindle member having an axial passageway extending from end to end thereof in which a second spindle member is located to rotate relative to the spindle member. The drill receiving end of the second spindle member is disposed in predetermined position relative to the drill receiving end of the first spindle member and the other end of the second spindle member protrudes beyond the other end of the first spindle member. The drill press includes a drive to rotate one of the spindle members and a gear connection between said members is provided to rotate the other spindle member at a different rate of speed.

In accordance with the invention, the inner and outer drill members may be rotated at their most practical speeds. This enables the feed to be accelerated with substantial savings resulting in time, labor, and expense, because the central core is removed by the inner drill member which has a higher rate of rotation than the outer drill member and because the retarding effect of the web is reduced to a minimum since the size of the web is approximately proportioned to that of a drill.

In the accompanying drawings, there is shown an illustrative embodiment of the invention from which its several novel features and advantages will be readily apparent.

In the drawings:

Fig. 1 is a vertical section of the head of a drill press,

Fig. 2 is a side view of the inner drill member, on an enlarged scale,

Fig. 3 is a similar view but with the inner drill turned 90°,

Fig. 4 is a side view of the outer drill member on the same scale as Figs. 2 and 3, Fig. 5 is a view of the outer drill member as seen from its shank end, and Fig. 6 is a view of the outer drill member as seen from its cutting end.

In the embodiment of the invention shown in the drawings, reference is first made to Figs. 4–6 in which the outer drill member 10 is illustrated as having a tapered shank 11 having tongues 12. The drill member 10 is provided with an axial bore 13 extending from end to end thereof and is so formed, as will be apparent from Fig. 6, that the bottom of each flute 14 is arcuate with respect to the drill axis. With respect to the lands 15, the drill member 10 may be said to have a tubular core 16. The cutting point 17 tapers inwardly and intersects the bore 13. By way of contrast, the conventional twist drill has a solid web intermediate its lands which at the cutting point presents such an obtuse angle, say 150° to the work, as to effect cutting by an inefficient scraping action. This impediment to drilling becomes particularly objectionable in larger drills.

The inner drill member 18 is shown in Figs. 2 and 3. The drill member 18 is dimensioned to fit within the bore 13 of the outer drill member 10 to rotate relative thereto and has a relatively long shank 19 to enable the cutting point 20 to protrude beyond the cutting point 17 of the drill member 10 when the extremity of the shank 19 is exposed beyond the extremity of the shank 11. The drill member 18 is also provided with a groove 21 extending from end to end of its shank 19 and opening into one of the flutes 22. The groove 21 may be used for the delivery of a coolant or lubricant between the drill members to the work.

In Fig. 1 there is shown a drill press head as illustrative of means by which the drill members 10 and 18 may be separately supported and rotated at different relative speeds.

The drill press frame 23 supports a pair of vertically spaced bearings 24 and 25. A drive pulley 26 has a sleeve 27 entrant of the bearing 24 and provided with an annular groove 28 to receive the retainer 29 shown as threaded through the bearing 24.

A housing 30 includes a sleeve 31 slidably supported by the bearing 25 to be raised and lowered on rotation of the shaft 32 by the lever 33 through gearing, conventional in drill presses, and accordingly omitted from the drawings.

A first spindle member 34 extends through the sleeve 31 and into the housing 30. Fast on the spindle member 34 is a gear 35 supported by the bearing unit 36. The spindle member 34 is flanged as at 37 at its lower end and interposed between it and the adjacent extremity of the sleeve 31 is a a bearing unit 38.

The spindle member 34 has a tapered socket 39 at its lower end to receive the shank 11 of the outer drill member 10. The socket 39 opens into an axial bore 40 and at 41 is shown the transverse slot which receives the tongues 12 of the outer drill member 10. The other end of the spindle member 34 has a cylindrical socket 42 also opening into the axial bore 40 to provide an axial passageway for the second or inner drill member 18.

The socket 42 also serves to receive one end of the second spindle member 43 which has an axial bore 44 extending from end to end thereof and a splineway 45 for the spline 46 fixed in the pulley 26 and the slidable key 47. The second spindle member 43 is provided with a chuck 48 to receive and anchor the extremity of the shank 19 of the inner drill member 18. The shank 19 extends through the bore 44 with the cutting point 20 protruding beyond the cutting point 17 of the drill 10 carried by the first spindle member 34.

The key 47 is exposed exteriorly of the housing 30 and has a part 50 shown as located within the pinion 49 to key it to the the spindle member 43. The gear 35 is also provided with a key way 51 dimensioned to receive the key part 50 so that the operator may slide the key 47 downwardly from the position in which it is shown to lock the gear 35 to the spindle member 43 so that the spindle members will rotate together to enable conventional drills to be used with a drill press in accordance with the invention.

The housing 30 has vertically alined bosses 52 rotatably supporting the spindle 53 adapted to be turned by the manually operated arm 54 and including an eccentric portion 55 for the gears 56 and 57 which mesh respectively, when the arm 54 is in the position shown in Fig. 1, with the pinion 49 and the gear 35. When the drill press is to be used with a conventional twist drill, the arm 54 is turned thereby to disengage the gear connection between the spindle members and the key 47 is then depressed to interconnect the spindle members for direct drive.

In practise, the flutes of the inner drill member 18 are short being preferably of a length not exceeding twice the drill diameter. Its shank, however, is of substantial length in order that it may extend through the chuck 48 to enable its cutting point to be positioned as desired relative to the cutting point of the outer drill 10.

From the foregoing, it will be appreciated that compound concentric drills and drill presses and the like in accordance with the invention are well adapted to accelerate the boring of large size holes in metal with attendant saving of time, labor and costs.

What I therefore claim and desire to secure by Letters Patent is:

In a drill press for use with concentric drills, a first spindle member for the outer drill and having an axial bore extending from end to end thereof, a second spindle member having one end entrant of said bore and rotatable relative to said first spindle member, said second spindle member having an axial bore, said bores in said members receiving the inner drill, the other end of said second spindle member being exposed, means engageable with said exposed end to rotate one of said second members, a gear fast on each of said spindle members, an operator control to lock the gear on the first spindle to the gear on the second spindle, a rotatable spindle including an eccentric, an operator control to turn said eccentric between first and second positions, and gears rotatable together relative to said spindle and in the first position of said eccentric meshing with respective ones of said spindle member gears.

References Cited in the file of this patent

UNITED STATES PATENTS

| | | |
|---|---|---|
| 53,896 | Stewart | Apr. 10, 1866 |
| 339,544 | Graham | Apr. 6, 1886 |
| 800,894 | Baldwin | Oct. 3, 1905 |
| 1,202,782 | Blauvelt | Oct. 31, 1916 |
| 2,390,744 | Smith | Dec. 11, 1945 |